June 1, 1948. W. C. BRANTINGHAM 2,442,720
RADIUS BORING TOOL
Filed Nov. 15, 1946 2 Sheets-Sheet 1
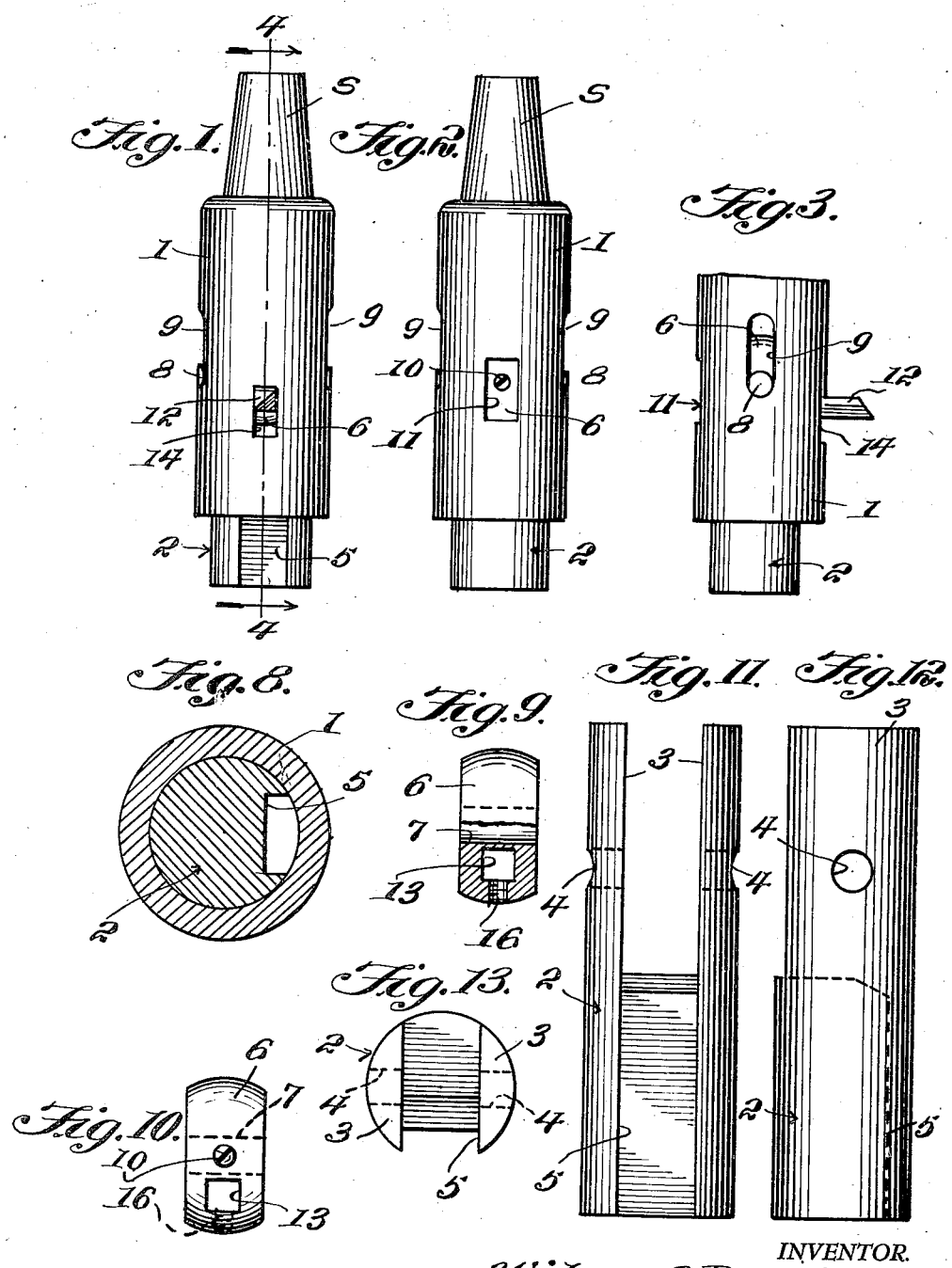
INVENTOR.
Wilson C. Brantingham,
BY Victor J. Evans & Co.
ATTORNEYS June 1, 1948. W. C. BRANTINGHAM 2,442,720
RADIUS BORING TOOL
Filed Nov. 15, 1946 2 Sheets-Sheet 2
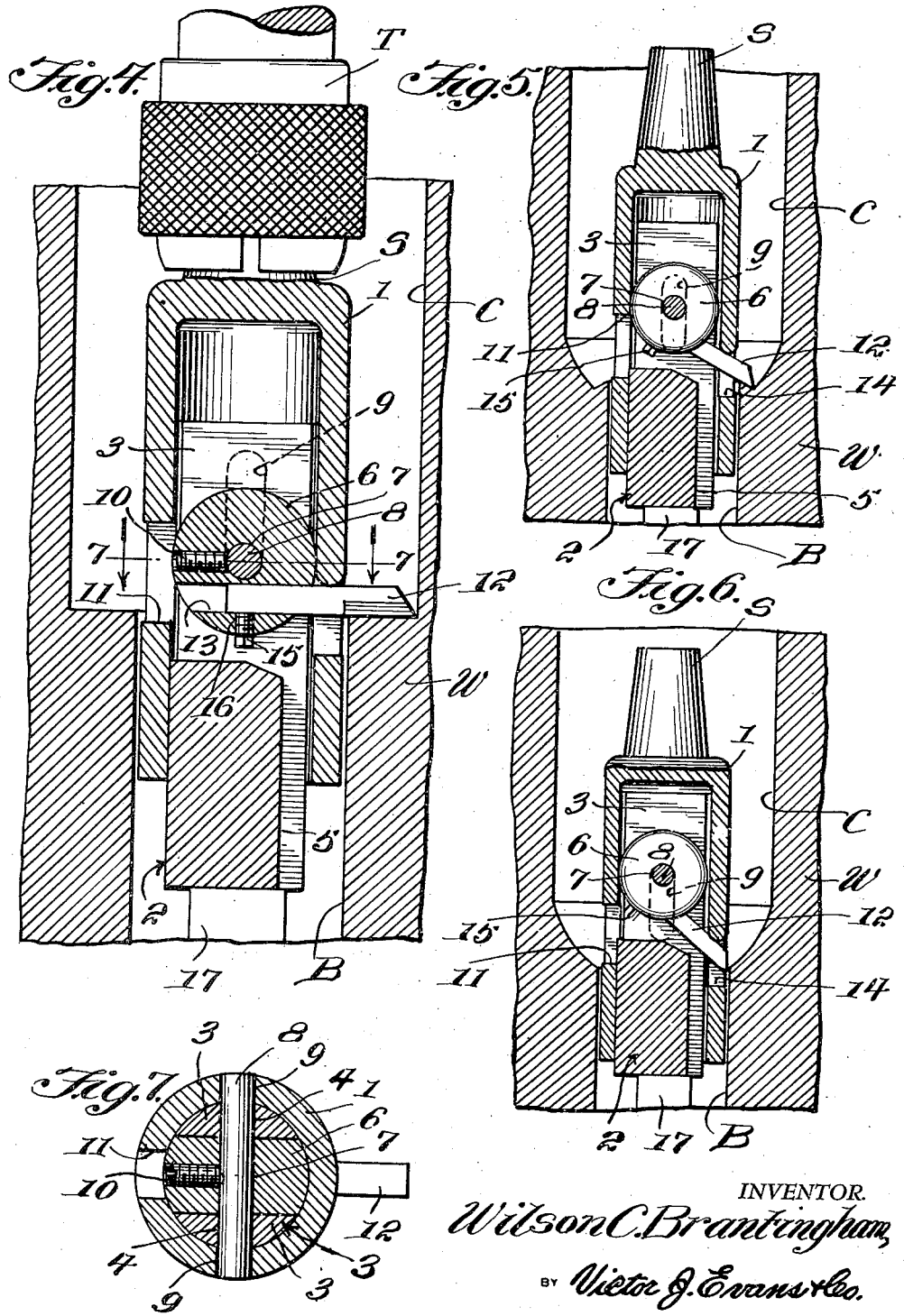
INVENTOR.
Wilson C. Brantingham,
BY Victor J. Evans & Co.
ATTORNEYS Patented June 1, 1948

2,442,720

UNITED STATES PATENT OFFICE 2,442,720

RADIUS BORING TOOL

Wilson C. Brantingham, Salem, Ohio

Application November 15, 1946, Serial No. 710,041

5 Claims. (Cl. 77—58)

My present invention relates generally to improvements in boring and drilling machines, and more specifically to an improved radius boring tool designed especially for use in a drill press of the rotary type, or similar machine tool. The primary object of the invention is the provision of a tool of this character including the boring bar, and head or bit holder, which is composed of a minimum number of component parts that may with facility be manufactured at low cost of production, and assembled with convenience to produce a compactly arranged counterboring tool in which the bit may be readily adjusted and rigidly mounted to bore with accuracy and precision.

The invention consists in certain novel combinations and arrangements of these parts as will hereinafter be described and more particularly pointed out in the appended claims.

In the accompanying drawings I have illustrated one complete example of a physical embodiment of my invention in which the component parts of the boring tool are combined and arranged in accord with one mode I have devised for the practical application of the principles of my invention. It will, however, be understood that changes and alterations are contemplated and may be made in these exemplifying drawings and mechanical structures, within the scope of my claims, without departing from the principles of the invention.

Figure 1 is a face view in elevation of the boring tool, showing the working edge of the bit; and Figure 2 is a rear view of the tool in Fig. 1.

Figure 3 is another view in elevation of the tool which is partly broken away, and disclosing the bit in working position.

Figure 4 is an enlarged detail vertical sectional view of the tool, as at line 4—4 of Fig. 1, together with a chuck, and disclosing the counterbored work with a flat or plane finished face.

Figure 5 is a similar view on a reduced scale showing the bit finishing the counterbore with a concave or hemispherical surface.

Figure 6 is a view similar to Fig. 5 with the bit retracted.

Figure 7 is an enlarged transverse sectional view at line 7—7 of Fig. 4 through the sleeve, bar, and head of the boring tool.

Figure 8 is an enlarged transverse sectional view through the sleeve and boring bar showing the clearance groove for chips in the bar.

Figure 9 is a view showing the boring head detached and partly in section; and Figure 10 is an exterior view of the boring head.

Figure 11 is a side view in elevation of the forked boring bar; and Figure 12 is another elevation view as seen from the left in Fig. 11; and Figure 13 is a top plan view of the boring bar in Fig. 11.

In order that the superior advantages in construction and operation of the novel boring tool may readily be understood I have shown in the assembly views the metal work W having a bore B and a counterbore C, and a machine operated tool chuck T is illustrated as clamped upon the tapered tool shank S of the tube or holder I for the tool. As the boring tool is revolved in its work, the tool is advanced by usual feed mechanism, and various operations of the tool are illustrated in Figures 4, 5, and 6.

Within the open end sleeve I, which is shown as a hollow cylinder or tubular holder, a forked boring bar 2 is mounted with a slip fit, and as best seen in Figs. 11 and 12 the generally cylindrical bar is slotted or milled at its upper end to provide the spaced arms 3, 3, having alined transversely extending holes 4, 4 drilled therein, and the solid, lower end of the forked bar is fashioned with an exterior depression or longitudinally extending groove 5 for chip clearance.

A boring head or bit holder 6 in the form of a double truncated sphere, or disk with an exterior spherical periphery and lateral flattened sides, is fitted between the arms of the forked bar, and the spherical periphery of the head conforms to the interior diameter of the sleeve or holder I and the exterior diameter of the boring bar 2.

The boring head is equipped with an axial bore 7, which when alined with the bores 4, 4, of the forked bar, receive the pin 8 with its ends mounted in longitudinally extending slots 9, 9, of the cylindrical or tubular sleeve I.

For securely mounting and tightening the adjustable boring head and its pin within the forked bar, a set screw or bolt 10 is threaded into the head for engagement with the pin, and the holder is provided with a milled longitudinally extending slot 11 through which access may readily be had to the screw by a tool for facile adjustment of the boring head upon its axis pin 8.

The radial bit or edge tool 12, which is square in cross section is adjustably mounted in an offset or off-center complementary bore 13 of the head, and the bit or cutting tool may longitudinally be adjusted, in combination with the adjustable boring head, to project through a slot 14 of the sleeve or holder I to operative position.

By means of a set bolt 15 threaded in a bore 16 of the head the bit may be securely fixed in adjusted operative position, and this adjustment and clamping of the bit may be accomplished, as indicated in Fig. 6, by elevating the boring head to give ready access through slot 11 to bolt 15 for a hand wrench adapted for the purpose.

In Fig. 4, where the tool has bored the work W at C to terminate in a flat or plane surface, it will be seen that the bit is rigidly held and supported in working position with pin 8 engaging the wall at the lower end of its guide slots 9, 9, and the bit 12 engaging the upper end wall of slot 14 of the holder or sleeve 1. The boring head and the bit are thus rigidly mounted for accurate and precise boring of the work W until the desired depth of the counterbore has been attained. Then the lower end of the boring bar 2 contacts with a stop 17 fixed and supported in the path of the boring tool and located within the smaller bore B.

Under control of the machine feeding mechanism in advancing and retracting the boring tool in Fig. 5, the tool is in adjusted position for finishing the counterbore C with a hemispherical cavity, and the bit is held rigidly against the upper end wall of the milled slot 14, while the head and its pin 8 occupy the central portion of the slots 9, 9.

In Fig. 6, at the completion of the boring operation indicated in Fig. 5, the bit is shown in retracted position, with the boring bar resting upon the stop 17, to indicate the position of parts in the insertion of the tool, and the withdrawal of the tool to and from the work.

Due to the simplicity in construction and operation of the parts within the interior of the tubular holder or sleeve they may with facility be adjusted to different diameters of work; and the boring tool may be manufactured in various sizes for use with different classes of work; and employed on standard drill presses or similar machine tools, without material changes to the machine or the tool holder.

Having thus fully described my invention, what I claim as new and desire to secure by Letters Patent is:

1. In a radius boring tool, the combination with a slotted cylindrical holder, of a forked boring bar slip fitted therein and formed with spaced arms having alined holes, a double-truncated spherical head mounted between said arms and a bit mounted in the head, an axis-pin mounted in the head with its ends supported in the alined holes, and means for rigidly holding the head in operative position.

2. In a boring tool as described, the combination with a slotted cylindrical holder having an open end, of a centrally slotted boring bar fitted therein and having alined holes, a double-truncated spherical head mounted in the slotted bar, an axis-pin mounted in the head with its ends supported in the alined holes, a bit mounted in an off-center bore of the head, and a set bolt threaded in the head for securing the bit.

3. The combination with a cylindrical holder having opposed longitudinal slots, of a formed boring bar fitted in the holder and having alined holes, a double-truncated spherical head having an axis pin mounted in said holes, and an adjustable bit mounted in the head and means for fixing the bit in adjusted position, whereby said pin and bit co-act respectively with the slotted holder for rigidly supporting the head and bit.

4. In a boring tool as described, the combination with a cylindrical open-end holder having a pair of opposed slots and a second pair of opposed slots arranged transversely thereof, of a forked boring bar having alined holes, a double-truncated spherical head having an axis-pin mounted in said holes, a set screw in the head engaging said pin and said pin having its ends mounted in a pair of slots of the holder, said head having an off-center bore and a bit mounted in the bore for projection through one of the second pair of slots, and a set bolt mounted in the head for holding the bit in adjusted position.

5. In a boring tool as described, the combination with a cylindrical open end holder, and a forked boring bar having axially alined holes and mounted in the holder, of a double-truncated spherical head mounted in the bar, an axis-pin mounted in the head with its ends located in slots of the holder, means for securing the pin within the head, an off-center bit mounted in the head for projection through a slot in the holder, and means for holding the bit in fixed position within the head.

WILSON C. BRANTINGHAM.